United States Patent Office 3,828,093
Patented Aug. 6, 1974

3,828,093
BENZOYLPHENYLACETIC ACIDS AND
RELATED COMPOUNDS
David Edmund Bays and Roy Vivian Foster, London,
England, assignors to Allen & Hanburys Limited, London, England
No Drawing. Filed July 25, 1968, Ser. No. 747,435
Claims priority, application Great Britain, July 31, 1967,
35,166/67
Int. Cl. C07c 65/20, 69/76
U.S. Cl. 260—469   9 Claims

ABSTRACT OF THE DISCLOSURE

Novel phenylacetic derivatives are provided of the general formula

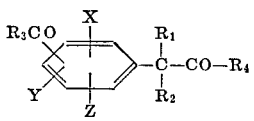

in which $R_1$, $R_2$, $R_3$ and $R_4$ are as defined herein, specifically wherein $R_1$, and $R_2$ which may be the same or different, represent a hydrogen atom or an alkyl radical containing 1–6 carbon atoms, which may be substituted by an aryl group, $R_3$ represents a cycloalkyl radical containing from 3–9 carbon atoms or an aryl radical which may be substituted by 1 or more halogen atoms or an alkyl, nitro, hydroxy, alkoxy, phenyl or trifluoromethyl group, or by a group —$NR_5R_6$ in which $R_5$ and $R_6$ which may be the same or different, represent a hydrogen atom or an alkyl radical containing from 1–6 carbon atoms, $R_4$ is a hydroxy, aryloxy or lower alkoxy group containing 1–6 carbon atoms, which may be substituted by an aryl radical or an amine group —$NR_5R_6$ or $R_4$ may be —$NR_7R_8$ in which $R_7$ and $R_8$, which may be the same or different, represent a hydrogen atom or an hydroxy group and an alkyl group containing 1–6 carbon atoms or an arylalkyl or aryl group, or $R_7$ and $R_8$ together may form a heterocyclic ring which may contain additional hetero atoms; X, Y and Z may the same or different and represent a hydrogen or halogen atom, a lower alkyl, hydroxy, lower alkoxy or amino group with the following provisos, that (a) when $R_1$, $R_2$, X, Y and Z are hydrogen, $R_3$ is phenyl and $R_4$ is hydroxyl then the group $R_3CO$ must be *meta* oriented to the group —$CR_1R_2COR_4$; (b) when $R_3CO$ is *para* oriented to the group $CR_1R_2COR_4$, $R_1$, $R_2$, X, Y and Z are hydrogen and $R_3$ is phenyl, then $R_4$ may not be a hydroxy, methoxy or primary amino group and (c) when Z is a methoxy group in the 2-position to the group —$CR_1R_2COR_4$ and X, Y, $R_1$ and $R_2$ are hydrogen and $R_3$ is phenyl then the group $R_3CO$— may not be in the 5-position, and pharmaceutically acceptable salts thereof. These have anti-inflammatory or analgetic activity. The invention also provides a process for the production of these compounds from a ketone of the structure:

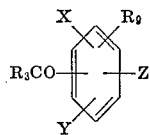

It also provides pharmaceutical compositions including phenylacetic derivatives.

This invention relates to novel phenylacetic acid derivatives possessing anti-inflammatory, or analgetic activity and to compositions containing the same.

The present invention provides phenylacetic acid derivatives of the general formula (I):

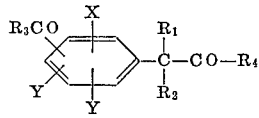

in which the group $R_3CO$— may only be *meta* or *para* oriented with respect to the side chain —$CR_1R_2COR_4$ and in which $R_1$ and $R_2$, which may be the same or different, represent a hydrogen atom or an alkyl radical containing 1 to 6 carbon atoms, which may be substituted by an aryl group, $R_3$ represents a cycloalkyl radical containing from 3 to 9 carbon atoms or an aryl radical which may be substituted by one or more halogen atoms or alkyl, nitro, hydroxy, alkoxy, phenyl or trifluoromethyl groups, or by a group —$NR_5R_6$ in which $R_5$ and $R_6$, which may be the same or different, represent a hydrogen atom or an alkyl radical containing from 1 to 6 carbon atoms; $R_4$ is a hydroxy, aryloxy, or lower alkoxy group containing 1 to 6 carbon atoms, which may be substituted by an aryl radical or an amine group —$NR_5R_6$ or $R_4$ may be —$NR_7R_8$ in which $R_7$ and $R_8$, which may be the same or different, represent a hydrogen atom or a hydroxy group, an alkyl group containing 1 to 6 carbon atoms, or an aralkyl or aryl group; or $R_7$ and $R_8$ together may form a heterocyclic ring which may contain additional heteroatoms; X, Y and Z may be the same or different and represent a hydrogen or halogen atom, a lower alkyl, hydroxy, lower alkoxy or amino group with the following provisos, that (a) when $R_1$, $R_2$, X, Y and Z are hydrogen, $R_3$ is phenyl and $R_4$ is hydroxyl then the group $R_3CO$ must be *meta* oriented to the group

—$CR_1R_2COR_4$;

(b) when $R_3CO$ is *para* oriented to the group $CR_1R_2COR_4$, $R_1$, $R_2$, X, Y and Z are hydrogen and $R_3$ is phenyl then $R_4$ may not be hydroxy, methoxy, ethoxy or primary amino group and (c) when Z is a methoxy group in the 2-position to the group —$CR_1R_2COR_4$ and X, Y, $R_1$ and $R_2$ are hydrogen and $R_3$ is phenyl then the group $R_3CO$— may not be in the 5-position.

The invention also provides a particular sub-class of compounds defined above but further excluding those compounds in which $R_1$, X, Y, and Z are hydrogen, $R_4$ is a hydroxy group, $R_2$ is an alkyl group containing 1 to 6 carbon atoms and $R_3$ is a phenyl group or a phenyl group substituted by a halogen atom or by an alkoxy or trifluoromethyl group and in which the $R_3CO$ group is in the *para* position with respect to the $CR_1R_2COR_4$ group.

This invention also provides physiologically acceptable salts of these compounds and optically active forms and racemic mixtures of the compounds which possess asymmetric carbon atoms, i.e. those compounds in which $R_1$ and $R_2$ represent different radicals.

We have made the unexpected discovery that certain of the compounds according to the invention possess anti-inflammatory and analgetic activity of great potential utility. Thus both m-benzoylphenyl acetic acid and p-benzoyl hydratopic acid are highly active at oral doses below 20 mg./kg. in suppressing the inflammation of rat paws following injection of carrageenin.

These compounds also have specific antibradykinin activity; thus for example at doses of 0.05 and 0.5 mg./kg. m-benzoylphenylacetic acid when injected intravenously antagonises the contraction of guinea pig bronchial muscle caused by bradykinin.

Non-steroidal anti-inflammatory drugs inhibit the increase in vascular permeability induced on guinea pig skin by irradiation with ultra violet light. In this test [C. V. Winder, J. Wax, V. Burr, M. Been and C. K. Rosiere, Arch. Int. Pharmacodyn. Ther. (1958), *116*, 261–292] m-benzoyl phenyl acetic acid and phenyl butazone have similar and relatively high potencies, the $ID_{50}$ values being 50.5 mg./kg. and 61.0 mg./kg. respectively. The results of these tests are given in Table I.

These screening tests were similar to those described by C. A. Winter, E. A. Risley and G. W. Nuss, Proc. Soc. Exper. Biol. & Med. (1962), *111*, 541–544 and by C. G. Van Arman, A. J. Begany, L. M. Miller and H. H. Pless, J. Pharmacol. (1965), *150*, 328–334 for the carrageenin test and H. Konzett and R. Rossler, Arch. Exp. Pathol. Pharmakol. (1940), *195*, 71–74 for the bradykinin test.

Analgesic activity was assessed by phenylquinone-writhing and tail pinch tests in mice.

The compounds may be formulated for use in human and veterinary medicine for therapeutic purposes. The invention therefore also provides pharmaceutical compositions comprising as active ingredients compounds of the general formula (I) as well as those compounds in which $R_3CO$ is para-oriented to the group $CR_1R_2COR_4$, $R_1$, $R_2$, X, Y and Z are hydrogen, $R_3$ is phenyl and $R_4$ is methoxy or ethoxy. Such compositions may be presented for use in a conventional manner with the aid of carriers or excipients and formulatory agents as are required and with or without supplementary medicinal agents. These compositions include, for example, solid and liquid preparations for oral use, suppositories, and injections. It is most convenient to use capsules or tablets which may be prepared according to conventional methods and may be coated if desired for oral administration. Injections may be formulated with the aid of physiologically acceptable carriers and agents as solutions, suspensions or as dry products which are reconstituted before use.

TABLE I

| Compound | Phenyl-quinone, oral, $ED_{50}$, mg./kg. | Tail clip, oral, $ED_{50}$, mg./kg. | Carra-geenin, oral, $ED_{50}$, mg./kg. | U.V. light, oral, $ED_{50}$, mg./kg. | Anti-bradykinin intravenous route |
|---|---|---|---|---|---|
| m-Benzoylphenyl acetic acid. | 3.4 | Weak activity, 50 mg./kg., orally. | <10 | 50.5 | <0.35 |
| Indomethacin | 2.5 | | 17.8 | | 2.5–5.0 |
| Aspirin | 57.0 | | | | |

The daily dose of the active ingredient is adjusted to the need of the patient and may for example be from 25 to 500 mgm. per day in divided doses depending on the age, weight and condition of the patient.

The compounds of general formula (I) may be prepared from the appropriately substituted ketone of general formula (II) where $R_3$, X, Y and Z have the meanings given above and $R_9$ may

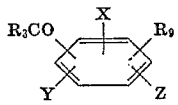

be a halomethyl, acetyl or carboxyl group. These compounds may be prepared by standard routes, for example.

(1)

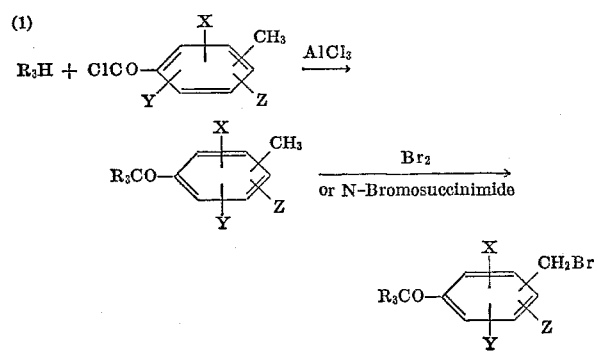

(2)

(3)

(4)

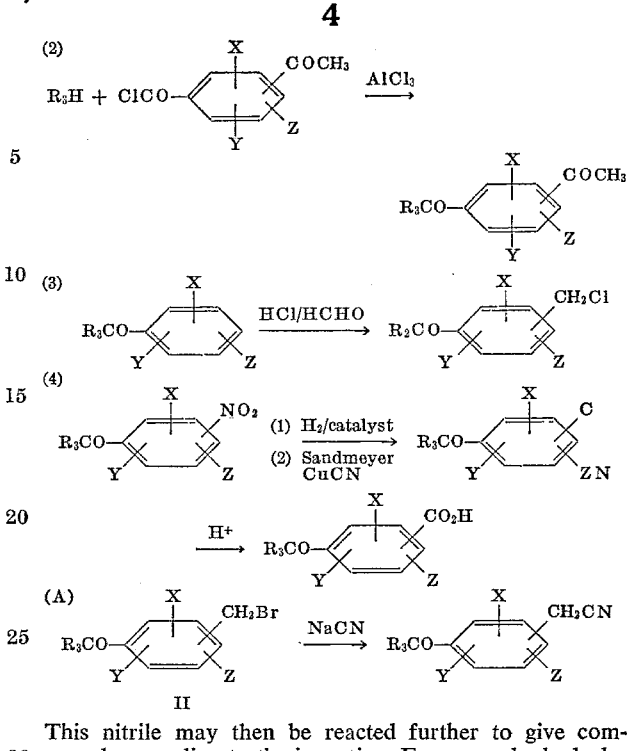

(A)

This nitrile may then be reacted further to give compounds according to the invention. For example, hydrolysis with a mixture of acetic acid, water, and sulphuric acid gives the acid (I, $R_4$=OH) and with concentrated sulphuric acid the amide (I, $R_4$=$NH_2$). Treatment with lower alcohols in the presence of acid catalysts give the esters (I, $R_4$=OAlk)

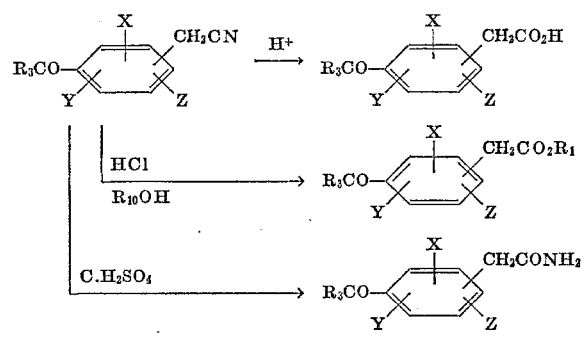

where $R_{10}$ is lower alkyl.

The ketone (II) where $R_9$ is an acetyl group may be reacted according to the Willgerodt reaction.

(B)

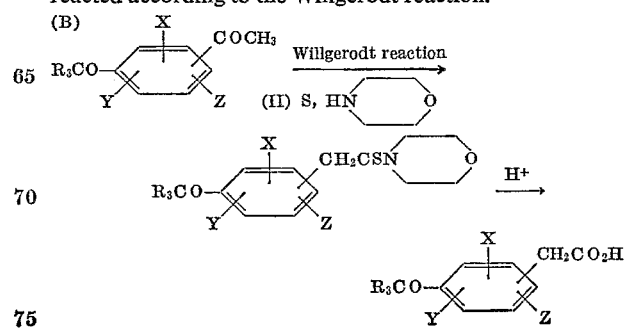

The ketone (II) where $R_9$ is a carboxyl group may be reacted as follows:

(C)
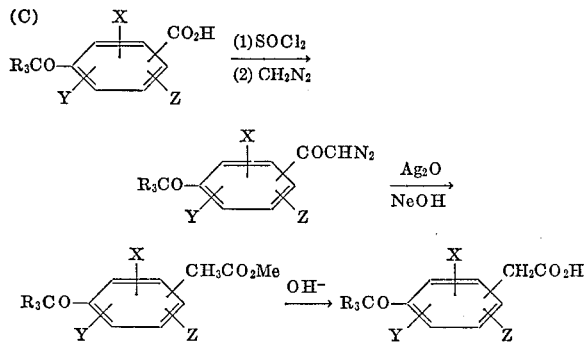

The compounds of general formula (I) in which $R_3$ is for example

may also be made by dealkylation for the corresponding alkoxy analogue with, for example, hydrobromic acid. When $R_3$ is, for example

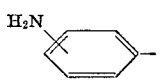

then catalytic reduction of the corresponding nitro compound with, for example, palladium on charcoal is a satisfactory preparation. Alkylation of this amine with a suitable alkylating agent, for example, with methyl iodide, gives the appropriate alkyl derivative —$NR_5R_6$.

The compounds of general formula (I) in which $R_4$ is alkoxy, aryloxy, aralkyloxy or aminoalkyloxy may also be prepared from the compounds in which $R_4$ is a hydroxy group by conventional methods of esterification, for example by reaction with an alcohol in the presence of an acid catalyst. This product may then be reacted further by conventional methods of transesterification, for example by reaction with an alcohol in the presence of a basic catalyst to give higher or substituted esters.

Compounds or general formula (I) in which $R_1$ and $R_2$ are alkyl or aralkyl may be made by reacting the compounds of formula (I) in which $R_4$ is alkoxy with a suitable base, for example sodium hydride, and reacting the mono- or di-anion so formed with a suitable alkylating agent, for example with methyl iodide.

The compounds of general formula I in which $R_4$ represents an amine group —$NR_7R_8$, where $R_7$ and $R_8$ have the meanings given above, may also be prepared by conventional methods, for example by the reaction of the compound of formula (I) in which $R_4$ is an alkoxy or chloro group with an amine of formula $NHR_7R_8$. Salts of the compounds of general formula (I), for example when $R_4$ is a hydroxy group may also be made by conventional methods, for example by reaction with organic or inorganic bases in a suitable solvent.

The following examples illustrate the invention:

EXAMPLE 1

(m-Benzoylphenyl)acetic acid.—3-Bromomethylbenzophenone: Bromine (30.4 ml.) was added with stirring at 150° C. to 3-methylbenzophenone (110 g.) over a period of 75 minutes. After 16 hours the reaction mixture was poured over ice and the filtered solid (67 g.) was crystallised from light petroleum (b.p. 80–100° C., m.p. 68–69° C.

3 - Cyanomethylbenzophenone.—Sodium cyanide (40 g.) in water (200 ml.) was heated at 100° for 6 hrs. with 3-bromoethylbenzophenone (160 g.) in dioxan 800 ml.). The solution was concentrated in vacuo to about 300 ml., water (600 ml.) was added, and the mixture was extracted with ether. The solvent was removed in vacuo to give a red-brown oil (116.5 g.) which crystallised from benzene-light petroleum (b.p. 60—80°), m.p. 63°.

(m-Benzoylphenyl)acetic acid, ethyl ester.—3-Cyanomethylbenzophenone (20 g.) was heated for 3 hours under reflux in 15% w./w. hydrogen chloride-ethanol (200 ml.). The solvent was removed in vacuo, the residue was diluted with water and the ester was extracted into ether. Distillation in vacuo of the residue from the ethereal extracts gave a colourless oil (18.5 g.), b.p. 166–168° at 0.1 mm.

(m-Benzoylphenyl)acetic acid.—(i) (m-Benzoylphenyl)acetic acid, ethyl ester (2.0 g.) in water (100 ml.) and ethanol (110 ml.) containing sodium hydroxide (10 g.) was left at room temperature for 2.5 hours. The solvent was removed in vacuo and the residue was dissolved in water washed with a little ether, and carefully acidified with 2N hydrochloric acid. The solid was crystallised from benzene. Yield 1.4 g., m.p. 113.5–115°.

(ii) Concentrated sulphuric acid (6 ml.), glacial acetic acid (6 ml.), water (6 ml.) and crude 3-cyanomethylbenzophenone (6 g.) were heated under reflux for 2 hours. An equal volume of water was then added and the precipitate was recrystallised from aqueous ethanol. Yield 5 g., m.p. 112°–113°.

EXAMPLE 2

(4 - Cyclohexanoylphenyl)acetic acid.—α-Bromo-p-tolylcyclohexyl ketone: Cyclohexyl p-tolyl ketone (10 g.), N-bromosuccinimide (8.8 g.) and benzoyl peroxide (0.5 g.) in carbon tetrachloride (200 ml.) were heated under reflux for 6.5 hours. Succinimide was filtered off and the solvent evaporated to give an oil (17 g.) which contained 70% of the required ketone.

4-Cyclohexanoylphenylacetonitrile.—Crude α-bromo-p-tolylcyclohexyl ketone (17 g.), sodium cyanide (3 g.), dioxan (80 ml.) and water (20 ml.) were heated under reflux for 4 hours. The mixture when cold was poured into water and extracted with ether. Evaporation of the extracts followed by chromatography on silica gave a solid (1.5 g.) which was crystallised from light petroleum (b.p. 60–80°), m.p. 102–103°.

(4-Cyclohexanoylphenyl)acetic acid.—4-Cyclohexanoyl phenylacetonitrile (1.5 g.), water (1.5 ml.), concentrated sulphuric acid (1.5 ml.) and acetic acid (1.5 ml.) were heated under reflux for 6 hours, cooled, poured into water and extracted with ether. Removal of the solvent and crystallisation from cyclohexane gave the acid, m.p. 94–95.5°.

The following compounds were prepared in a similar manner and had the following m.p.'s.

[3-(4-Chlorobenzoyl)phenyl]acetic acid, 149–150°;
[4-(4-Chlorobenzoyl)phenyl]acetic acid, 142°;
[3-(4-Methoxybenzoyl)phenyl]acetic acid, 144–145°;
[4-(4-Methoxybenzoyl)phenyl]acetic acid, 139–141°;
[3-(4-Hydroxybenzoyl)phenyl]acetic acid, 156–157°;
[3-(α,α,α-Trifluoromethyl-m-toluoyl)phenyl]acetic acid, 123–124°;
[4-(α,α,α-Trifluoromethyl-m-toluoyl)phenyl]acetic acid, 126–127°;
[4-(2,4-Dichlorobenzoyl)phenyl]acetic acid, 90–92°;
[4-(2,6-Dichlorobenzoyl)phenyl]acetic acid, 188–189°;
[4-(4-Biphenylcarbonyl)phenyl]acetic acid, 176–178°;
[3-(4-Biphenylcarbonyl)phenyl]acetic acid, 158–160°;
(4-Amino-3-benzoylphenyl)acetic acid, 135–137°.

EXAMPLE 3

(5-Benzoyl-2,4-xylyl)acetic acid.—3-Chloromethyl-4,6-dimethylbenzophenone: 2,4-Dimethylbenzophenone (39.8 g.), paraformaldehyde (6.4 g.), fused zinc chloride (6.2 g.), concentrated hydrochloric acid (200 ml.) and acetic acid (300 ml.) were stirred vigorously at 80–85° for 49 hours. The mixture was cooled, diluted with water and extracted with ether. The residue from the ethereal extract was distilled and the fraction boiling at 125–140° at 0.2 mm. (16.1 g.) was crystallised from light petroleum (b.p. 60–80°), m.p. 76.5–79°.

3 - Cyanomethyl - 4,6 - dimethylbenzophenone. — 3-Chloromethyl - 4,6 - dimethylbenzophenone (17.6 g.), dioxan (120 ml.), water (40 ml.) and sodium cyanide (3.3 g.) were heated under reflux for 5.5 hours. The mixture was cooled, diluted with water and extracted with ether. Removal of the ether gave an oil (19.6 g.) which failed to crystallise.

(5-Benzoyl-2,4-xylyl)acetic acid.—3-Cyanomethyl-4,6-dimethylbenzophenone (19.6 g.), acetic acid (50 ml.), water (10 ml.) and concentrated sulphuric acid (10 ml.) were heated under reflux for 3 hours, cooled and diluted with water. Extraction with ether gave an oil which was taken up with dilute alkali, washed with ether, and acidified with 2N hydrochloric acid. The solid was crystallised from a mixture of ethyl acetate and light petroleum (b.p. 60–80°), m.p. 111–113°.

The following compounds were prepared in a similar manner and had the following m.p.'s.

(3-Benzoyl-mesityl)acetic acid, 148–151°;
(5-Benzoyl-2-hydroxyphenyl)acetic acid, m.p. 184.7°.

EXAMPLE 4

[4 - (2,4 - Dimethylbenzoyl)phenyl]acetic acid.—4-Acetyl-2',4'-dimethylbenzophenone: Powdered aluminum chloride (9.0 g.) was added in portions with stirring at 0° C., to 4-acetylbenzoyl chloride (5.4 g.) in m-xylene (100 ml.). The solution was allowed to attain room temperature over 2.5 hrs., poured onto ice and concentrated hydrochloric acid, and extracted with ether. Evaporation of the extracts and crystallisation from light petroleum (b.p. 60–80°) gave the ketone, m.p. 89°–91°.

4[4-(2,4 - Dimethylbenzoyl)phenylthioacetyl]morpholine.—4-Acetyl-2',4'-dimethylbenzophenone (7.0 g.), sulphur (2.0 g.) and morpholine (15 ml.) were heated under reflux for 2.5 hours, cooled, and diluted with chloroform. Evaporation of the acid-washed chloroform extract gave a brown oil (13 g.) which failed to crystallise.

[4 - (2,4-Dimethylbenzoyl)phenyl]acetic acid. — 4[4-(2,4-Dimethylbenzoyl)phenylthioacetyl]morpholine (13.0 g.) in glacial acetic acid (100 ml.) and 50% sulphuric acid (50 ml.) was heated under reflux for 2 hours, cooled, poured into water, and extracted with ether. Evaporation of the extract gave a yellow solid (3.8 g.) which was crystallised from benzene, light petroleum (b.p. 60–80°), m.p. 90–91°.

The following compounds were prepared in a similar manner and had the following m.p.'s.

[4-(p-Toluoyl)phenyl]acetic acid, 145.5–147;
[4-(2',4',6'-Trimethylbenzoyl)phenyl]acetic acid, 114–115°;
[3-(2',4'-Dimethylbenzoyl)phenyl]acetic acid 83.5–85°.

EXAMPLE 5

(3-Benzoyl-p-tolyl)acetic acid, dicyclohexylamine salt.—5-Amino-2-methylbenzophenone: 2-Methyl-5-nitrobenzophenone (5.0 g.) in ethanol (500 ml.) was reduced with hydrogen and 5% palladium on charcoal (0.5 g.) at 25–35° C. The catalyst was filtered off and the solvent evaporated to give an oil (4.6 g.). The hydrochloride crystallised from ethyl acetate had m.p. 154–155°.

5-Cyano-2-methylbenzophenone.—5-Amino-2 - methylbenzophenone (10.3 g.) was diazotised in hydrochloric acid at 0° C. with sodium nitrite (3.5 g.) and was then added, in portions, to a stirred solution of cuprous cyanide, freshly prepared from cupric sulphate (15.5 g.), in sodium cyanide. The mixture was stirred on a steam bath for 1 hour cooled, and extracted with benzene. Evaporation of the benzene gave a black tar (9.1 g.), exhaustive extraction of which with light petroleum (b.p. 80–100°) gave the nitrile as a deep yellow oil (6.6 g.).

3-Benzoyl-4-methylbenzoic acid.—5 - Cyano-2-methylbenzophenone (6.6 g.) was heated under reflux for 6 hours in concentrated hydrochloric acid (100 ml.) and acetic acid (50 ml.). The mixture was cooled, poured onto ice, and filtered. The solid was dissolved in sodium carbonate solution washed with a little ether, reprecipitated with dilute hydrochloric acid, and crystallised from benzene, light petroleum (b.p. 60–80°), m.p. 139–140°.

(3-Benzoyl-4-methylphenyl)acetic acid, methylester.—3-Benzoyl-4-methylbenzoic acid (2.8 g.) was heated under reflux with thionyl chloride (20 ml.) for 2 hours. Unchanged thionyl chloride was removed in vacuo, the residue (3.0 g.) dissolved in ether (25 ml.) and added at 0° C. to a diazomethane solution prepared from N-nitrosomethylurea (14 g.), 40% potassium hydroxide solution (100 ml.) and ether (200 ml.). After 1 hr. at 0° C. and 65 hrs. at room temperature the ether was removed in vacuo and the residue (3.0 g.) dissolved in dry methanol (25 ml.). Silver oxide (0.5 g.) was added in small portions over 1 hour and the mixture was heated under reflux for 4 hours. The solids were filtered off and the solvent removed to leave a residue which contained some silver. This was removed by chromatography on alumina. Evaporation of the benzene gave the ester as a yellow oil (2.0 g.).

(3 - Benzoyl-4-methylphenyl)acetic acid, dicyclohexylamine salt.—(3-Benzoyl - 4 - methylphenyl)acetic acid, methyl ester (2.0 g.), ethanol (20 ml.) and potassium hydroxide (1.0 g.) were left at room temperature for 3 hours. The solvent was removed in vacuo and the residue dissolved in water, washed with chloroform and acidified with dilute hydrochloric acid. The oil (1.2 g.) was dissolved in ether and treated with dicyclohexylamine (0.82 g.) in ether. The dicyclohexylamine salt was recrystallised from methanol/ether, m.p. 153–154°.

The following compounds were prepared in a similar manner and these had the following m.p.'s.

(3-Benzoyl-o-tolyl)acetic acid, dicyclohexylamine salt, 170°;
4-Benzoyl-m-tolyl)acetic acid, dicyclohexylamine salt, 138–139°;
[4 - (Nitrobenzoyl)phenyl]acetic acid, methyl ester, 102.5°.

EXAMPLE 6

(3-Benzoylphenyl)acetic acid, methyl ester.—3-Benzoylphenyl)acetic acid (3.0 g.), methanol (70 ml.), and boron trifluoride etherate (0.5 ml.) were left at room temperature for 20 hr. after which the solvent was removed in vacuo. The residue was dissolved in ether, washed with sodium bicarbonate solution and water, dried (MgSO$_4$), and evaporated to give an oil (2.4 g.), b.p. 153–4° at 0.1 mm.

The following compounds were prepared in a similar manner and had the following m.p.'s or b.p.'s.

(4-Benzoylphenyl)acetic acid, butyl ester, 190–192° at 0.6 mm.;
(3-Benzoylphenyl)acetic acid, butyl ester, 168–169° at 0.1 mm.;
(3-Benzoylphenyl)acetic acid, ethyl ester, 174–175° at 0.7 mm.;
(3-Benzoylphenyl)acetic acid, benzyl ester 44°.

The following ester was made from a suitable nitrile in a way similar to that previously described in Example 1.

[3-(4 - Methoxybenzoyl)phenyl)phenyl]acetic acid, ethyl ester, 184° at 0.05 mm.

EXAMPLE 7

(3-Benzoylphenyl)acetic acid, β-dimethylamino ethanol ester, hydrochloride.—Sodium (0.03 g.) was added to dry 2-dimethylaminoethanol (2 ml.) in dry toluene (20 ml.) and the solution heated to reflux temperature (110° C.). (3-Benzoylphenyl)acetic acid, ethyl ester (5 g.) in toluene (10 ml.) was slowly added and the ethanol distilled off until the temperature again reached 110° C. The solution was cooled and extracted with 2N hydrochloric acid. The base was precipitated with 2N sodium hydroxide solution and extracted into ether. The extracts were washed with water, dried ($MgSO_4$), and the ester hydrochloride precipitated with ethereal hydrogen chloride and recrystallised from ethanol (1.5 g.), m.p. 184°.

EXAMPLE 8

(3-Benzoylphenyl)acetamide.—3 - Cyanomethylbenzophenone (5 g.) and concentrated hydrochloric acid (50 ml.) were stirred at room temperature for 3 hours and at 40° for 2 hours; cooled and diluted with water. The amide (0.6 g.) was filtered off and recrystallised from aqueous ethanol, m.p. 117–118°.

EXAMPLE 9

(3 - Benzoylphenyl(acethydroxamic acid.—Hydroxylamine hydrochloride (1.4 g.) and potassium hydroxide (1.7 g.) in methanol (20 ml.) were added to (m-benzoylphenyl)acetic acid, ethyl ester (2.7 g.) in methanol (10 ml.). The potassium chloride was filtered off and the filtrate was left to stand at room temperature for 3 days and reduced to a small volume when the product crystallised as a 1:1 molecular complex of the hydroxamic acid and its potassium salt (0.8 g.), m.p. 147.5–148.5°.

The following compound was made in a similar manner.
(4-Benzoylphenyl)acethydroxamide acid, m.p. 120.7°.

EXAMPLE 10

(3-Benzoylphenyl)acetic acid, sodium salt.—(3-Benzoylphenyl) acetic acid (3.1 g.) in ethanol (10 ml.) was added to sodium bicarbonate (1.08 g.) in water (10 ml.). The solution was evaporated *in vacuo*, the residue was dissolved in ethanol and filtered, and the sodium salt was precipitated with ether (2.5 g.), m.p. 145–147°.

The following compounds were prepared in a similar manner and have the following m.p.'s.

(4-Benzoylphenyl)acetic acid sodium salt, m.p. 210.4°;
(3-Benzoylphenyl)acetic acid, dicyclohexylamine salt, m.p. 144–145°.

EXAMPLE 11

4-Benzoylhydratropic acid.—4-Benzoylhydratropic acid, methyl ester. In an inert atmosphere (4-benzoylphenyl) acetic acid, methyl ester (15.0 g.) in dimethylformamide (60 ml.) was added dropwise with stirring over 10 minutes to sodium hydride (2.8 g.) (50% dispersion in oil) in dimethylformamide (100 ml.), the temperature being kept at 30° C. After 1.5 hours, methyl iodide (15 g.) in dimethylformamide (50 ml.) was added dropwise, with stirring, over 15 minutes keeping the temperature at 10–15° C. After 45 minutes at room temperature the mixture was poured onto ice and the solid (17 g.) was crystallised from cyclohexane, m.p. 69.3°.

4 - Benzoylhydratropic acid.—4 - Benzoyl hydratropic acid, methyl ester (2.5 g.), ethanol (20 ml.), water (2 ml.), and sodium hydroxide (0.8 g.) were left at room temperature for 1 hour and the solvent was then removed *in vacuo*. The residue was dissolved in water, treated with charcoal, and carefully acidified with 2N hydrochloric acid to give a solid (2.0 g.), which on crystallisation from benzene, light petroleum (b.p. 60–80°) had m.p. 113° C.

The following compounds were made in a similar manner, and have the following m.p.'s or b.p.'s.

3-Benzoylhydratropic acid, dicyclohexylamine salt, 153.3°: methyl ester, 172–6° at 1.0 mm.;
3-benzoyl-α-methylhydratropic acid: methyl ester, 172–6° at 0.5 mm.;
4-benzoyl-α-methyl hydratropic acid, 141.8°: methyl ester, 151°;
2-(4-benzoylphenyl)-3-methyl butyric acid, 150.8°; methyl ester, 71.8°;
4-benzoyl-β-phenyl hydratropic acid, methyl ester, 95.1°.

EXAMPLE 12

Preparation of (m-benzoylphenyl)acetic acid.—m-Toluyl-chloride: 250 g. of m-toluic acid was dissolved in 200 ml. of thionyl chloride and warmed for 2 hours over a steam bath until evolution of hydrogen chloride had ceased. The excess thionyl chloride was distilled off "in vacuo" to leave 272 g. of crude m-toluylchloride.

(b) 3-Methylbenzophenone: 272 g. of a mixture of crude m-toluyl chloride and 144 g. of benzene were dissolved in 186 ml. of dry carbon disulphide. 300 g. of aluminum chloride was then slowly added in 20 g. portions, the temperature being kept at 0° C. When the addition was complete (45 minutes), the temperature was allowed to rise to room temperature and the mixture was left standing for 60 hours, and poured onto ice and hydrochloric acid. The mixture was extracted with ether. The ether and carbon disulphide were removed from the extracts and the residue was dissolved in ether, washed with alkali and water, and dried. The ether was removed "in vacuo" and the residue distilled. The fraction collected distilled at 120–140° C. at a pressure of 0.9–1.5 mm. with the bulk distilling at 125–130° C.

(c) 3-Bromomethylbenzophenone: 30.4 ml. of bromine was added with stirring at 180° C. to 110 g. of 3-methylbenzophenone over 75 minutes. The reaction was left for 16 hours until evolution of hydrogen bromide ceased. The reaction mixture was then poured over ice and a dark oil separated which solidified on agitation. 67 g. of the filtered solid was crystallised from petroleum spirit, M.P. 68–69° C.

(d) 3-Cyanomethylbenzophenone: 67 g. of a solution of 3-bromomethylbenzophenone in 150 ml. of absolute alcohol was added dropwise to a solution of 16.75 g. of sodium cyanide in 21 ml. of water. The mixture was then warmed on a steam bath for 2 hours when thin layer chromatography showed the reaction to be complete. The solvents were removed "in vacuo" and the residue was washed with water and extracted with ether. The ether was removed "in vacuo" and the residue distilled. The fraction which distilled at 208–210° C. (0.7–0.8 mm.) was collected, and 38 g. of the product was obtained. The product was distilled as rapidly as possible with a flame since decomposition occurs throughout the distillation.

(e) (m-Benzoyl phenyl)acetic acid: A mixture of 6 ml. of concentrated sulphuric acid, 6 ml. of glacial acetic acid and 6 ml. of water was added to 6 g. of the crude 3-cyanomethyl benzophenone. The resulting mixture was heated under reflux for 2 hours. An equal volume of water was then added and a white solid precipitated out. On recrystallisation from aqueous ethanol, 5 g. of the product, m.p. 112–113° were obtained.

EXAMPLE 13

(4-Benzoylphenyl)aceitc acid, ethyl ester.—A solution of 4-benzoylphenylacetic acid in ethanol (500 ml.) containing borontrifluoride etherate (2 ml.) was left to stand at room temperature for three days. The ethanol was removed *in vacuo*, the solid residue dissolved in ether, washed first with dilute sodium carbonate solution and then with water. The ethereal solution was dried ($MgSO_4$)

and evaporated to give a solid. It was crystallised twice from ethanol. M.p. 61–62.5°.

EXAMPLE 14

(4-Benzoylphenyl)acetic acid, methyl ester.—Crude (4-benzoylphenyl)acetic acid, (60 g.) was dissolved in absolute methanol (400 ml.). The solution was heated under gentle reflux during two hours whilst a slow stream of hydrogen chloride was passed through. The methanol was then removed and the residual oil taken up into ether, and washed successively with sodium carbonate solution, water, and saturated brine. After drying ($MgSO_4$), the ether was removed, and the methyl ester (46 g.) distilled (b.p. 184–185°/1.0 mm.). The distillate crystallised, and was recrystallised from methanol, giving prisms. M.p. 58–59°.

EXAMPLE 15

(4-Benzoylphenyl)-N-phenethyl-acetamide.—(4 - Benzoylphenyl)acetic acid (9.0 g.), thionyl chloride (4.5 g.) and pyridine (0.1 ml.) in dry benzene (250 ml.) were allowed to stand for 24 hours at room temperature. Removal of the solvent left a solid which was crystallised from light petroleum (b.p. 60–80°), m.p. 62°.

The acid chloride (1.0 g.), 2-phenylethylamine (5.5 g.) and pyridine (0.3 g.) in dry xylene (120 ml.) were heated under reflux for 16 hours. The cooled solution was washed with 2N hydrochloric acid. Removal of the solvent left an oil from which a solid was obtained by chromatography on silica. The product was crystallised from aqueous methanol, m.p. 116–117°.

In a similar manner the following compounds were also prepared:

N-(4-Benzoylphenylacetyl)piperidine, m.p. 61–62°
  (3-Benzophenyl)-N-methylacetamide, m.p. 82°
  (3-Benzoylphenyl)-N-phenylacetamide, m.p. 112–113°
1-(3-Benzoylphenylacetyl) - 4 - methylpiperazine, m.p. 110°
  (4-Benzoylphenyl) - N,N - dimethylacetamide, $N_{30}{}^D$ 1.5949
  (3-Benzoylphenyl) - N,N - dimethylacetamide, $N_{30}{}^D$ 1.5929

EXAMPLE 16

To prepared 10,000 tablets each containing 100 mg. (m-benzoylphenyl) acetic acid.—Mix together 1,000 g. of powdered (m-benzoylphenyl)acetic acid with 750 g. of calcium sulphate dihydrate and sufficient of a 5% solution of low viscosity sodium carboxymethylcellulose to produce a damp cohesive mass. Granulate the damp mass by passing through a 16 mesh sieve. Dry the granules at 45–50° C. Pass the dried granules through a 20 mesh sieve and mix the sieved granules with 240 g. of maize starch and 10 g. of magnesium stearate.

Compress the lubricated granules on a suitable tablet machine using $10/32''$ diameter normal concave punches to produce tablets each weighing 200 mg.

EXAMPLE 17

To prepare 100,000 sugar coated tablets each containing 100 mg. (m-benzoylphenyl)acetic acid.—Mix together 10 kg. of powdered (m-benzoylphenyl)acetic acid with 7.5 kg. of calcium sulphate dihydrate and sufficient of a 5% solution of low viscosity sodium carboxymethylcellulose to produce a damp cohesive mass. Granulate the damp mass by passing through a 16 mesh sieve. Dry the granules at 45–50° C. Pass the dried granules through a 20 mesh sieve and mix the sieved granules with 2.4 kg. of maize starch and 100 g. of magnesium stearate.

Compress the lubricated granules on a suitable tablet machine using $10/32''$ diameter *deep concave* punches .

Place the tablet cores in a coating pan of suitable size. Heat the cores to 45° C. by means of hot air and apply 200 ml. of a syrup containing 12% by weight of acacia and 66% by weight of sucrose. Allow the tablets to roll until they are evenly coated with the syrup then dry by means of heated air. Repeat this step.

Continue the sugar coating using a syrup containing 60% by weight of sucrose and 15% by weight of calcium phosphate until the tablet cores each weigh 325 mg.

Continue coating using a syrup containing 66% by weight of sucrose and a suitable colouring agent until the tablets weight 350 mg. each. Finally polish the tablets using known techniques.

EXAMPLE 18

To prepare 100,000 enteric coated tablets each containing 100 mg. (m-benzoylphenyl)acetic acid.—Prepare the tablet cores as described in Example 2.

Rotate the tablet cores in a suitable coating pan and apply 200 ml. of a solution containing 10% by weight of polyvinylpyrrolidone 2% by weight of polyethylene glycol 6000 in 66 o.p. industrial alcohol. Dry off the solvents with cold air and repeat the operation. Apply in a similar manner a film of celluose acetate phthalate sufficient to enable the tablets to confirm to the disintegration test for enteric coated tablets of the British Pharmacopoeia, 1963, p. 1158.

The cellulose is applied in solution in suitable mixed solvents such as acetone/alcohol and may contain plasticisers such as castor oil.

When a satisfactory thickness of cellulose acetate phthalate has been applied the sugar coating procedure as outlined in Example 2 is followed.

EXAMPLE 19

Capsules

To prepare 10,000 capsules each containing 50 mg. (m-Benzoylphenyl) acetic acid.—Mix together 500 g. (m-Benzoylphenylacetic acid) finely powdered and 500 g. micro-crystalline cellulose. Fill the mixed powders into No. 4 hard gelatin capsules, each capsule containing 100 mg. of the mixture.

Although Examples 16 to 19 relate to the use of (m-benzoylphenyl)acetic acid as the active ingredient, any of the compounds described herein can, of course, be used in place of the (m-benzoylphenyl)acetic acid. In particular ortho- and para-benzoyl phenylacetic acid methyl and ethyl esters may be used.

What is claimed is:

1. A compound selected from the group consisting of a *meta* substituted phenylacetic acid derivative of the formula:

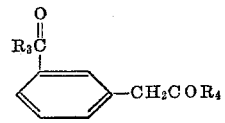

wherein
  $R_3$ is phenyl substituted by one member selected from the group consisting of halogeno, trifluoromethyl and alkoxy of 1 to 6 carbon atoms;
  $R_4$ is hydroxy or alkoxy of 1 to 6 carbon atoms, and a pharmaceutically acceptable salt of said derivative in which $R_4$ is hydroxy with an organic or inorganic base.

2. The compound of claim 1 which is [3-(4-chlorobenzoyl)phenyl]acetic acid.

3. The compound of claim 1 which is [3-(4-methoxybenzoyl)phenyl]acetic acid.

4. The compound [4-(4-methoxybenzoyl)phenyl]acetic acid.

5. The compound of claim 1 which is [3-(*m*-trifluoromethyl-benzoyl)phenyl]acetic acid.

6. The compound [4-(2,4-dichlorobenzoyl)phenyl]acetic acid.

7. The compound [4-(2,6-dichlorobenzoyl)phenyl]acetic acid.

8. The compound of claim 1 which is [3-(4-methoxybenzoyl)phenyl]acetic acid, ethyl ester.

9. The compound 4-benzoyl-β-phenyl hydratopic acid, methyl ester.

References Cited

UNITED STATES PATENTS
3,479,356  11/1969  Fouche _____ 260—517

FOREIGN PATENTS
1,516,775  2/1968  France.

OTHER REFERENCES
Chem. Abstracts, vol. 50 (1956), pp. 5611-4.
Chem. Abstracts, vol. 51 (1957), p. 12071.
Chem. Abstracts, vol. 53 (1959), pp. 7157-8.
Chem. Abstracts, vol. 58 (1964), pp. 16045-6.
Chem. Abstracts, vol. 59 (1965), pp. 3810-1.
Farge et al.: Chem. Abstracts, vol. 70 (1966), p. 307, abstract of S. African Pat. 68/524 (June 25, 1968).

JAMES A. PATTEN, Primary Examiner

U.S. Cl. X.R.

260—239 AA, 247.1, 268 C, 293.8 465 R, 465 E, 465 F, 465 G, 471 R, 472, 473 R, 500.5 H, 501.1, 558 R, 558 A, 559 R, 559 D, 559 A, 591, 517; 424—308, 309, 324